UNITED STATES PATENT OFFICE.

A. C. HOWELL, OF VIENNA, NEW JERSEY.

IMPROVED BEVERAGE.

Specification forming part of Letters Patent No. 48,405, dated June 27, 1865.

*To all whom it may concern:*

Be it known that I, ALEXANDER C. HOWELL, of the town of Vienna, in the county of Warren, State of New Jersey, have invented a new and useful composition of material for making a drink, which I call "Cream Soda-Water;" and I do hereby declare the following to be a full and correct description of materials used, and the mode of combining the same for the purpose of producing said drink.

Soda-water as commonly prepared in the shops, it is well known, requires costly and complicated machinery in its preparation, and therefore will, as an article of trade, only justify the erection of soda-fountains in cities and towns of considerable population. Families in the country and in small towns and villages are therefore generally, if not entirely, deprived of the use of this agreeable and healthy drink for the warm season of the year. Soda-powders are sold and used sometimes as a substitute for the more delicious drink of the fountain; but it is well known, also, that this is so inferior a representative of the pure article it is rarely resorted to, except as a medicine.

The object of my invention is to produce an article that can be prepared by and kept in every household, and from which soda-water of scarcely appreciable inferiority to that of the best fountain can be made at once and at any time, and in any quantity that may be required.

To enable others skilled in the art to prepare this drink, I will proceed to state the materials used therefor, and the mode of using them.

I take one ounce and a half of super or bicarbonate of soda and dissolve it in one quart of hot water. When dissolved I add thereto three pounds of white or loaf sugar, then take the whites of four eggs and one table-spoonful of wheat-flour, and beat them together and mix them well with the aforesaid compound of sugar, soda, and water. The composition thus formed may be flavored with any of the usual flavoring materials—such as oil of lemon, &c., extracts of vanilla, pine-apple, &c., to suit the taste.

When the soda-water is to be prepared for use, put into a tumbler or other suitable vessel a small quantity of tartaric, citric, or other suitable acid, adding so much water thereto as may be necessary to dissolve this acid, if it be used in powder or a solid state. Then, first shaking the above-described composition, add so much thereof to the dissolved acid—say, one or two table-spoonfuls to a common tumbler—as will give the mixture when made the desired sweetness and flavor, and immediately add or fill up the tumbler or other vessel with cold or ice water.

I do not propose to confine myself to the exact proportions above described in making the drink, nor to the specific materials mentioned. For instance, honey could be substituted for white sugar, thus making an agreeable mead. In some cases vinegar or acetic acid might be used instead of citric or tartaric acids. Brown sugar might, for the sake of economy, be used for white, and the quantity of this and the other materials changed to suit the taste or pleasure of the drinkers; or certain quantities of wine or spirits might be added, if desired.

Having thus fully set forth the composition and mode of preparation of my improved cream soda-water, what I claim therein, and desire to secure by Letters Patent of the United States, is—

The drink composed of the materials and prepared in the manner substantially as herein described.

A. C. HOWELL

Witnesses:
 GILBERT B. TOWLES,
 H. KING.